United States Patent
Asbag et al.

(10) Patent No.: US 10,748,271 B2
(45) Date of Patent: Aug. 18, 2020

(54) METHOD OF DEFECT CLASSIFICATION AND SYSTEM THEREOF

(71) Applicant: Applied Materials Israel, Ltd., Rehovot (IL)

(72) Inventors: Assaf Asbag, Alfei Menashe (IL); Orly Zvitia, Tel-Aviv (IL); Idan Kaizerman, Meitar (IL); Efrat Rosenman, Aseret (IL)

(73) Assignee: APPLIED MATERIALS ISRAEL LTD., Reovot (IL)

( * ) Notice: Subject to any disclaimer, the term of this patent is extended or adjusted under 35 U.S.C. 154(b) by 202 days.

(21) Appl. No.: 15/962,909

(22) Filed: Apr. 25, 2018

(65) Prior Publication Data
US 2019/0333208 A1 Oct. 31, 2019

(51) Int. Cl.
| | |
|---|---|
| G06K 9/00 | (2006.01) |
| G06K 9/62 | (2006.01) |
| G01B 5/28 | (2006.01) |
| G01N 21/00 | (2006.01) |
| G06T 7/00 | (2017.01) |

(52) U.S. Cl.
CPC .......... G06T 7/0006 (2013.01); G06K 9/6221 (2013.01); G06K 9/6256 (2013.01); G06K 9/6268 (2013.01); G06T 2207/20081 (2013.01); G06T 2207/30148 (2013.01)

(58) Field of Classification Search
USPC .................. 382/149, 224; 356/237.2; 702/35
See application file for complete search history.

(56) References Cited

U.S. PATENT DOCUMENTS

| | | | |
|---|---|---|---|
| 5,982,920 A * | 11/1999 | Tobin, Jr. .............. | G06T 7/0004 382/145 |
| 6,718,526 B1 | 4/2004 | Eldredge et al. | |
| 6,885,977 B2 | 4/2005 | Gavra et al. | |
| 7,676,077 B2 | 3/2010 | Kulkarni et al. | |
| 8,135,204 B1 * | 3/2012 | Chen .................. | G01N 21/9501 250/310 |
| 8,165,837 B1 | 4/2012 | Paramasivam et al. | |
| 8,254,661 B2 * | 8/2012 | Auerbach ............ | G06K 9/3233 382/141 |
| 8,255,172 B2 * | 8/2012 | Auerbach .......... | G01N 21/9501 702/35 |
| 8,315,453 B2 * | 11/2012 | Shlain .................. | G06K 9/6256 382/149 |

(Continued)

*Primary Examiner* — Kathleen Y Dulaney
(74) *Attorney, Agent, or Firm* — Lowenstein Sandler LLP

(57) ABSTRACT

There are provided system and method of classifying defects in a specimen. The method includes: obtaining one or more defect clusters detected on a defect map of the specimen, each cluster characterized by a set of cluster attributes comprising spatial attributes including spatial density indicative of density of defects in one or more regions accommodating the cluster, each given defect cluster being detected at least based on the spatial density thereof meeting a criterion; for each cluster, applying a cluster classifier to a respective set of cluster attributes thereof to associate the cluster with one or more labels of a predefined set of labels, wherein the cluster classifier is trained using cluster training data; and identifying DOI in each cluster by performing a defect filtration for each cluster using one or more filtering parameters specified in accordance with the label of the cluster.

20 Claims, 7 Drawing Sheets

(56) References Cited

U.S. PATENT DOCUMENTS

| | | | |
|---|---|---|---|
| 8,553,970 B2 | 10/2013 | Auerbach | |
| 9,607,233 B2 | 3/2017 | Kaizerman et al. | |
| 9,613,255 B2* | 4/2017 | Amzaleg | G06K 9/00161 |
| 9,715,723 B2* | 7/2017 | Shlain | G06T 7/0004 |
| 2007/0156379 A1* | 7/2007 | Kulkarni | G06F 30/30 |
| | | | 703/14 |
| 2007/0230770 A1* | 10/2007 | Kulkarni | G06F 30/30 |
| | | | 382/149 |
| 2007/0288219 A1* | 12/2007 | Zafar | G06T 7/0008 |
| | | | 703/14 |
| 2009/0080759 A1* | 3/2009 | Bhaskar | G06T 7/001 |
| | | | 382/141 |
| 2013/0279795 A1* | 10/2013 | Shlain | G06T 7/0004 |
| | | | 382/149 |
| 2015/0254832 A1* | 9/2015 | Plihal | G06T 7/001 |
| | | | 382/149 |
| 2016/0189055 A1 | 6/2016 | Zvitia | |
| 2018/0130199 A1* | 5/2018 | Brauer | G01N 21/9501 |
| 2018/0197714 A1* | 7/2018 | Plihal | H01J 37/222 |
| 2018/0204315 A1* | 7/2018 | Plihal | G06K 9/627 |
| 2019/0067060 A1* | 2/2019 | Plihal | G06T 7/001 |
| 2019/0073566 A1* | 3/2019 | Brauer | G06T 7/0002 |
| 2019/0147283 A1* | 5/2019 | Giering | G06F 16/55 |

* cited by examiner

METHOD OF DEFECT CLASSIFICATION AND SYSTEM THEREOF

TECHNICAL FIELD

The presently disclosed subject matter relates, in general, to the field of defect classification, and more specifically, to methods and systems of classifying defects in a specimen.

BACKGROUND

Current demands for high density and performance associated with ultra large scale integration of fabricated devices require submicron features, increased transistor and circuit speeds, and improved reliability. As semiconductor processes progress, pattern dimensions such as line width, and other types of critical dimensions, are continuously shrunken. This is also referred to as the design rule. Such demands require formation of device features with high precision and uniformity, which, in turn, necessitates monitoring of the fabrication process, including frequent and detailed inspections of the devices while they are still in the form of semiconductor wafers, including both finished devices and/or unfinished devices.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The complex manufacturing process of specimens is not error-free and such errors may cause faults in manufactured devices. The faults may include defects that can harm operation of the device, and nuisances, which may be defects, but do not cause any harm or malfunction of the manufactured device. By way of non-limiting examples, defects may be caused during the manufacturing process, due to faults in the raw material, mechanical, electrical or optical errors, human errors or others. Further, defects may be caused by spatio-temporal factors, such as temperature changes of the wafer occurring after one or more manufacturing stages during the examination process, which may cause some deformations of the wafer. The examination process can also introduce further alleged errors, for example due to optical, mechanical or electrical problems in the examination equipment or process, which thus provide imperfect captures. Such errors may produce false positive findings, which may seem to contain a defect, but no actual defect exists at the area.

In many applications, the type, or class, of a defect is of importance. For example, defect may be classified into one of a number of classes, such as a particle, a scratch, process, or the like.

Unless specifically stated otherwise, the term "examination" used in this specification should be expansively construed to cover any kind of detection and/or classification of defects in an object. Examination is provided by using, e.g., non-destructive examination tools during or after manufacture of the object to be examined. By way of non-limiting example, the examination process can include scanning (in a single or in multiple scans), sampling, reviewing, measuring, classifying and/or other operations provided with regard to the object or parts thereof, using one or more examination tools. Likewise, examination can be provided prior to manufacture of the object to be examined and can include, for example, generating an examination recipe(s). It is noted that, unless specifically stated otherwise, the term "examination" or its derivatives used in this specification are not limited with respect to the size of the inspected area(s), to the speed or resolution of the scanning or to the type of examination tools. A variety of non-destructive examination tools includes, by way of non-limiting example, optical tools, scanning electron microscopes, atomic force microscopes, etc.

Examination process can include a plurality of examination steps. During the manufacturing process, the examination steps can be performed a multiplicity of times, for example after the manufacturing or processing of certain layers, or the like. Additionally or alternatively, each examination step can be repeated multiple times, for example for different wafer locations or for the same wafer locations with different examination settings.

By way of non-limiting example, run-time examination can employ a two-step procedure, e.g. inspection of a specimen followed by review of sampled defects. During the inspection step, the surface of a specimen or a part thereof (e.g. areas of interest, hot spots, etc.) is typically scanned at relatively high-speed and/or low-resolution. The captured inspection image is analyzed in order to detect defects and obtain locations and other inspection attributes thereof. At the review step the images of at least part of defects detected during the inspection phase are, typically, captured at relatively low speed and/or high-resolution, thereby enabling classification and, optionally, other analyses of at least part of defects. In some cases both phases can be implemented by the same inspection tool, and, in some other cases, these two phases are implemented by different inspection tools.

Most often, the goal of examination is to provide high sensitivity to defects of interest while suppressing detection of nuisance and noise on the wafer. There is a need in the art for improving the sensitivity of defect detection.

General Description

In accordance with certain aspects of the presently disclosed subject matter, there is provided computerized system of capable of classifying defects in a specimen, the system comprising a processing and memory circuitry (PMC) configured to: obtain one or more defect clusters detected on a defect map of the specimen, each given defect cluster characterized by a respective set of cluster attributes comprising one or more spatial attributes, wherein the one or more spatial attributes include spatial density indicative of density of defects in one or more regions on the defect map accommodating the given defect cluster, and each given defect cluster is detected at least based on the spatial density thereof meeting a density criterion; for each given defect cluster, apply a cluster classifier to a respective set of cluster attributes thereof to associate the given defect cluster with one or more labels of a predefined set of labels, wherein the cluster classifier is trained using cluster training data comprising a plurality of pre-labelled defect clusters and cluster attributes thereof; and identify DOI in each given defect cluster by performing a defect filtration for each given defect cluster using one or more filtering parameters, wherein the one or more filtering parameters are specified in accordance with the label of the given defect cluster.

In addition to the above features, the system according to this aspect of the presently disclosed subject matter can comprise one or more of features (i) to (xii) listed below, in any desired combination or permutation which is technically possible:

(i). The defect map can comprise non-clustered defects, and the PMC can be further configured to identify DOI in the non-clustered defects by performing a defect filtration for the non-clustered defects using one or more filtering parameters, and combine the identified DOI in each given defect cluster and the identified DOI in the non-clustered defects to provide an overall DOI information of the specimen.

(ii). The one or more spatial attributes can be selected from a group comprising spatial density, area, defect count, shape, and aspect ratio of the one or more regions on the defect map accommodating the given defect cluster.

(iii). The set of cluster attributes can further comprise a filter rate related attribute.

(iv). The filter rate related attribute can be a cluster filter rate indicative of the number of defects filtered out when applying a defect filter in a given defect cluster as relative to the total number of defects in the given defect cluster. The defect filter can be trained using defect training data comprising a plurality of pre-classified defects and defect attributes thereof.

(v). The criterion can be specified differently for defect clusters with different spatial characterizations.

(vi). Each label can be indicative of a given defect cluster class. The given defect cluster class can at least represent that a defect cluster classified thereto comprises an expected percentage of a specific category of defects or a type of defects in a specific category that meets classification criterion of the given defect cluster class. The specific category can be selected from a group constituted of Defects of Interest (DoI) and nuisance.

(vii). The predefined set of labels can comprise a first label and a second label. The first label can be indicative of a first class at least representing that a defect cluster classified thereto comprises an expected percentage of DOI that meets a first class classification criterion, and the second label can be indicative of a second class at least representing that a defect cluster classified thereto comprises an expected percentage of nuisance that meets a second class classification criterion.

(viii). The one or more filtering parameters can comprise a working point.

(ix). The defect filtration for the non-clustered defects can be performed using a defect filter with a training working point. The defect filter can be trained in a training process based on defect training data comprising a plurality of pre-classified defects and defect attributes thereof. The training working point is a working point selected to be used in the training process.

(x). The working point specified in accordance with the label of a given defect cluster can be selected as relative to the training working point based on a classification sensitivity corresponding to the label.

(xi). The predefined set of labels can comprise a first label and a second label. The first label can be indicative of a first class at least representing that a defect cluster classified thereto comprises an expected percentage of DOI that meets a first class classification criterion, and the second label can be indicative of a second class at least representing that a defect cluster classified thereto comprises an expected percentage of nuisance that meets a second class classification criterion. The working point specified in accordance with the first label can be selected as a sensitive working point as relative to the training working point, and the working point specified in accordance with the second label can be selected as an aggressive working point as relative to the training working point.

(xii). The system can further comprise an examination tool configured to examine the specimen and obtain the defect map thereof.

In accordance with another aspect of the presently disclosed subject matter, there is provided a computerized method of classifying defects in a specimen, the method comprising: obtaining, by an I/O interface, one or more defect clusters detected on a defect map of the specimen, each given defect cluster characterized by a respective set of cluster attributes comprising one or more spatial attributes, wherein the one or more spatial attributes include spatial density indicative of density of defects in one or more regions on the defect map accommodating the given defect cluster, and each given defect cluster is detected at least based on the spatial density thereof meeting a density criterion; for each given defect cluster, applying, by a processing and memory circuitry (PMC) operatively connected to the I/O interface, a cluster classifier to a respective set of cluster attributes thereof to associate the given defect cluster with one or more labels of a predefined set of labels, wherein the cluster classifier is trained using cluster training data comprising a plurality of pre-labelled defect clusters and cluster attributes thereof; and identifying, by the PMC, DOI in each given defect cluster by performing a defect filtration for each given defect cluster using one or more filtering parameters, wherein the one or more filtering parameters are specified in accordance with the label of the given defect cluster.

This aspect of the disclosed subject matter can comprise one or more of features (i) to (xii) listed above with respect to the system, mutatis mutandis, in any desired combination or permutation which is technically possible.

In accordance with another aspect of the presently disclosed subject matter, there is provided a non-transitory computer readable storage medium tangibly embodying a program of instructions that, when executed by a computer, cause the computer to perform a method of method of classifying defects in a specimen, the method comprising: obtaining one or more defect clusters detected on a defect map of the specimen, each given defect cluster characterized by a respective set of cluster attributes comprising one or more spatial attributes, wherein the one or more spatial attributes include spatial density indicative of density of defects in one or more regions on the defect map accommodating the given defect cluster, and each given defect cluster is detected at least based on the spatial density thereof meeting a density criterion; for each given defect cluster, applying a cluster classifier to a respective set of cluster attributes thereof to associate the given defect cluster with one or more labels of a predefined set of labels, wherein the cluster classifier is trained using cluster training data comprising a plurality of pre-labelled defect clusters and cluster attributes thereof; and identifying DOI in each given defect cluster by performing a defect filtration for each given defect cluster using one or more filtering parameters, wherein the one or more filtering parameters are specified in accordance with the label of the given defect cluster.

This aspect of the disclosed subject matter can comprise one or more of features (i) to (xii) listed above with respect to the system, mutatis mutandis, in any desired combination or permutation which is technically possible.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "classifying", "obtaining", "detecting", "applying", "training", "associating", "identifying", "performing", "filtering", "selecting", "representing", "using", "scanning", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the computerized system of classifying defects in a specimen and parts thereof as well as the PMC therein disclosed in the present application.

The terms "non-transitory memory" and "non-transitory storage medium" used herein should be expansively construed to cover any volatile or non-volatile computer memory suitable to the presently disclosed subject matter.

The term "defect" used in this specification should be expansively construed to cover any kind of abnormality or undesirable feature or void formed on or within a specimen.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
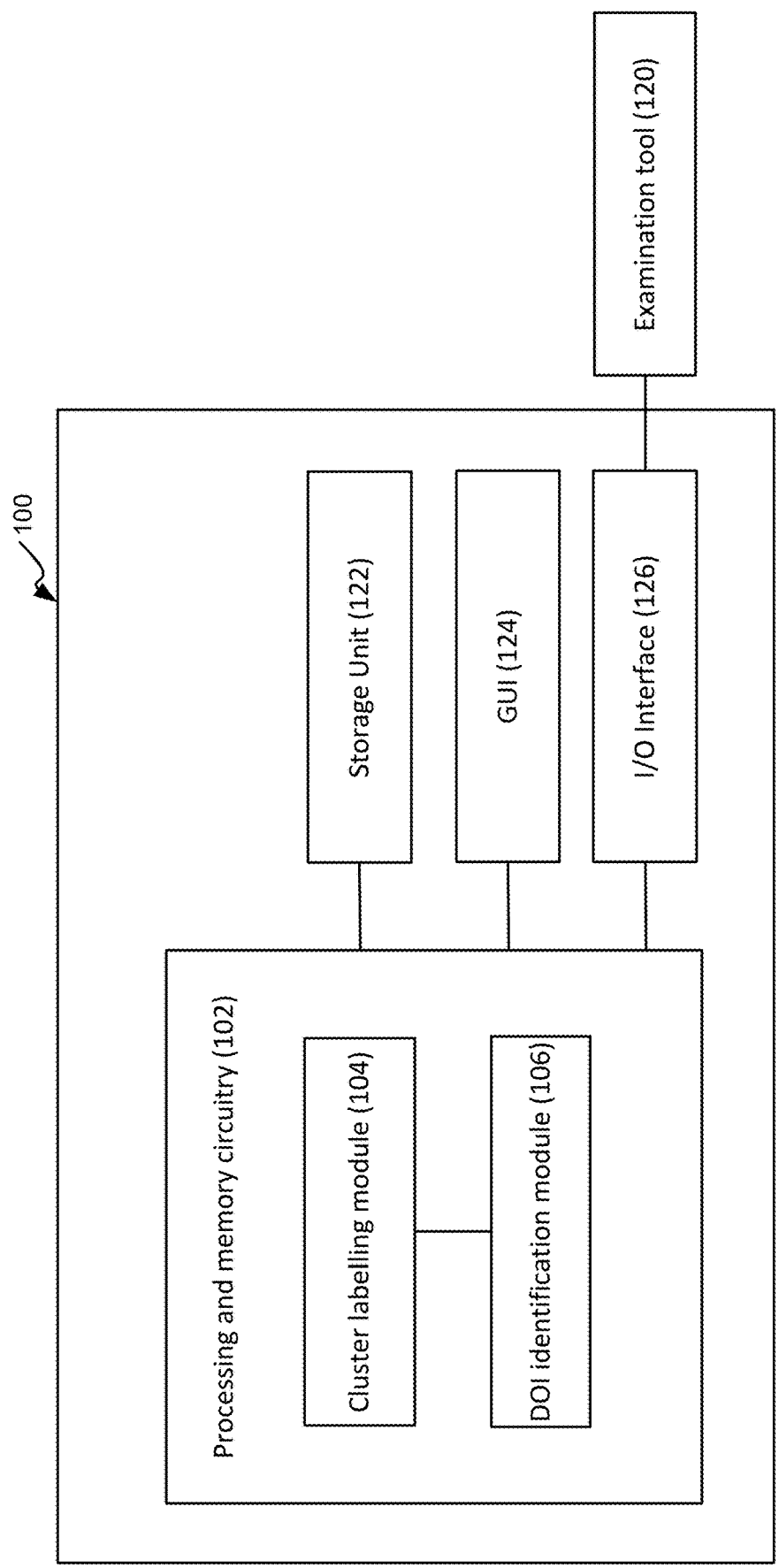
FIG. 1 illustrates a block diagram of a system capable of classifying defects in a specimen in accordance with certain embodiments of the presently disclosed subject matter.

Bearing this in mind, attention is drawn to FIG. 1 illustrating a block diagram of a system capable of classifying defects in a specimen in accordance with certain embodiments of the presently disclosed subject matter.

The system 100 illustrated in FIG. 1 can be used for classifying defects in a specimen (e.g. of a wafer and/or parts thereof). According to certain embodiments, the specimen used herein can be selected from a group comprising: a wafer, a reticle, a mask, an integrated circuit and a flat panel display (or at least a part thereof), etc.

System 100 can comprise one or more examination tools 120. The term "examination tool(s)" used herein should be expansively construed to cover any tools that can be used in examination-related processes including, by way of non-limiting example, imaging, scanning (in a single or in multiple scans), sampling, reviewing, measuring, classifying and/or other processes provided with regard to the specimen or parts thereof. The one or more examination tools 120 can include one or more inspection tools and/or one or more review tools. In some cases, at least one of the examination tools 120 can be an inspection tool configured to scan an entire specimen (e.g., an entire wafer or at least an entire die) to capture inspection images (typically, at relatively high-speed and/or low-resolution) for detection of potential defects. In some cases, at least one of the examination tools 120 can be a review tool, which is configured to capture review images of at least part of defects detected by inspection tools for ascertaining whether a potential defect is indeed a defect. Such a review tool is usually configured to inspect fragments of a die, one at a time (typically, at relatively low-speed and/or high-resolution). Inspection tool and review tool can be different tools located at the same or at different locations, or a single tool operated in two different modes. In some cases at least one examination tool can have metrology capabilities.

Without limiting the scope of the disclosure in any way, it should also be noted that the examination tools 120 can be implemented as inspection machines of various types, such as optical imaging machines, electron beam inspection machines and so on.

According to certain embodiments, the examination tool 120 can be configured to examine the specimen by capturing one or more images of the specimen and obtain a defect map indicative of defect distribution on the specimen. The images can be resulted from different examination modality (s), and the present disclosure is not limited by the inspection and metrology technology used for generating the images. In some embodiments, the examination tool 120 can be an inspection tool configured to scan the specimen with certain examination/scan configuration to capture the one or more images. In some cases, the captured images of the specimen can be processed (e.g., by an image processing module whose functionality can be either integrated within the examination tool 120 or within a processing and memory circuitry (PMC) 102 as described below, or implemented as a standalone computer) in order to generate a defect map indicative of suspected locations on the specimen having high probability of being a defect of interest (DOI). It is to be noted that the suspected defects as reflected in the defect map can comprise DOI, nuisance as well as false alarms/random noises.

The term "Defect of interest (DOI)" used herein refers to any real defects that are of the user's interest to be detected. For instance, any "killer" defects that may cause yield loss and affect operability or reliability of the specimen can be indicated as DOI, as in comparison to nuisance defects which are also real defects but do not impact yield and therefore should be ignored.

The term "nuisance" or "nuisance defects" used herein should be expansively construed to include any unwanted or not-of-interest defects that are real defects but do not affect operability or reliability of the specimen.

Except for DOI and nuisance, there are also false alarms/random noises included in the defect map that are caused by different variations (e.g., process variation, color variation, mechanical and electrical variations, etc.) during examination.

For purpose of simplicity and illustration of the description, in certain embodiments of the following description, the term "nuisance" can be construed broadly to cover any non-DOI defects on the defect map, including nuisance defects as described above and false alarms/random noises. Therefore, suspected defects as reflected in the defect map can be deemed as comprising DOI and nuisance.

System 100 can comprise a Processing and memory circuitry (PMC) 102 operatively connected to a hardware-based I/O interface 126 and the examination tool 120. PMC 102 is configured to provide all processing necessary for operating system 100 as further detailed below with reference to FIG. 2. PMC 102 comprises a processor (not shown separately within the PMC) and a memory (not shown separately within the PMC). The processor of PMC 102 can be configured to execute several functional modules in accordance with computer-readable instructions implemented on a non-transitory computer-readable memory comprised in the PMC. Such functional modules are referred to hereinafter as comprised in the PMC 102.

Functional modules comprised in the PMC 102 can comprise a cluster labelling module 104, and a DOI identification module 106, which are operatively connected with each other. The PMC 102 can be configured to obtain, via I/O interface 126, one or more defect clusters detected on a defect map of the specimen. Each defect cluster is characterized by a respective set of cluster attributes comprising one or more spatial attributes including spatial density. The spatial density is indicative of density of defects in one or more regions on the defect map accommodating the given defect cluster. Each defect cluster can be detected at least based on the spatial density thereof meeting a density criterion. Optionally, the PMC 102 can further comprise a cluster detection module (not shown in FIG. 1) configured to detect the one or more defect clusters on the defect map as aforementioned, instead of receiving them as an input via the I/O interface 126.

The cluster labelling module 104 can be configured to, for each given defect cluster, apply a cluster classifier (not shown separately in FIG. 1) to a respective set of cluster attributes thereof to associate the given defect cluster with one or more labels of a predefined set of labels. The cluster classifier is an automated classifying tool which can be trained based on cluster training data comprising a plurality of pre-labelled defect clusters and cluster attributes of the pre-labelled defect clusters. In some embodiments, the cluster classifier can be implemented as a stand-alone computer operatively connected to system 100 and/or examination tool 120. Alternatively, the cluster classifier can be fully or partly integrated with system 100 and/or examination tool 120. For instance, the cluster classifier can be hosted by the examination tool.

The DOI identification module 106 can be configured to identify DOI in each given defect cluster by performing a defect filtration for each given defect cluster using one or more filtering parameters. The one or more filtering parameters can be specified in accordance with the label of the given defect cluster. The cluster classification and DOI identification will be described below in further detail with reference to FIG. 2.

According to certain embodiments, system 100 can comprise a storage unit 122. The storage unit 122 can be configured to store any data necessary for operating system 100, e.g., data related to input and output of system 100, as well as intermediate processing results generated by system 100. In addition, the storage unit 122 can be configured to store data including acquired images and/or derivatives thereof (e.g., defect map, defect clusters, etc.) produced by the examination tool 120. Accordingly, the data can be retrieved from the storage unit 122 and provided to the PMC 102 for further processing. Additionally or alternatively, system 100 can be operatively connected to one or more external data repositories (not shown in FIG. 1) which are configured to store data required by system 100.

In some embodiments, system 100 can optionally comprise a computer-based Graphical user interface (GUI) 124 which is configured to enable user-specified inputs and render outputs related to system 100. For instance, the user can be presented with a visual representation of the specimen (for example, by a display forming part of GUI 124), including e.g., image data and defect data of the specimen. The user may be provided, through the GUI, with options of defining certain operation parameters. The identified DOI can be sent to GUI 124 for rendering the results for the user's review.

It is to be noted that although it is illustrated in FIG. 1 that the examination tool 120 is implemented as an external unit operatively connected to system 100 to operate in conjunction therewith, in certain embodiments, the functionalities of the examination tool 120, or at least part of, can be integrated as a part of system 100. In such cases, system 100 can be deemed as comprising the examination tool 120 or at least part thereof. For instance, the functionality of image processing of the examination tool 120 can be implemented as part of the PMC 102. By way of another example, PMC 102 and storage unit 122 may form part of the PMC and storage (not shown separately), respectively, of examination tool 120; and the I/O interface and GUI (not shown separately) of the examination tool 120 may function as I/O interface 126 and GUI 124.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and hardware.

It is noted that the system illustrated in FIG. 1 can be implemented in a distributed computing environment, in which the aforementioned functional modules shown in FIG. 1 can be distributed over several local and/or remote devices, and can be linked through a communication network. It is further noted that although functional modules of PMC 102, storage unit 122, and GUI 124 are illustrated as being part of the system 100 in FIG. 1, in some other embodiments, at least part of the aforementioned units can be implemented as being external to system 100 and can be configured to operate in data communication with system 100 via I/O interface 126.

Figure 2:
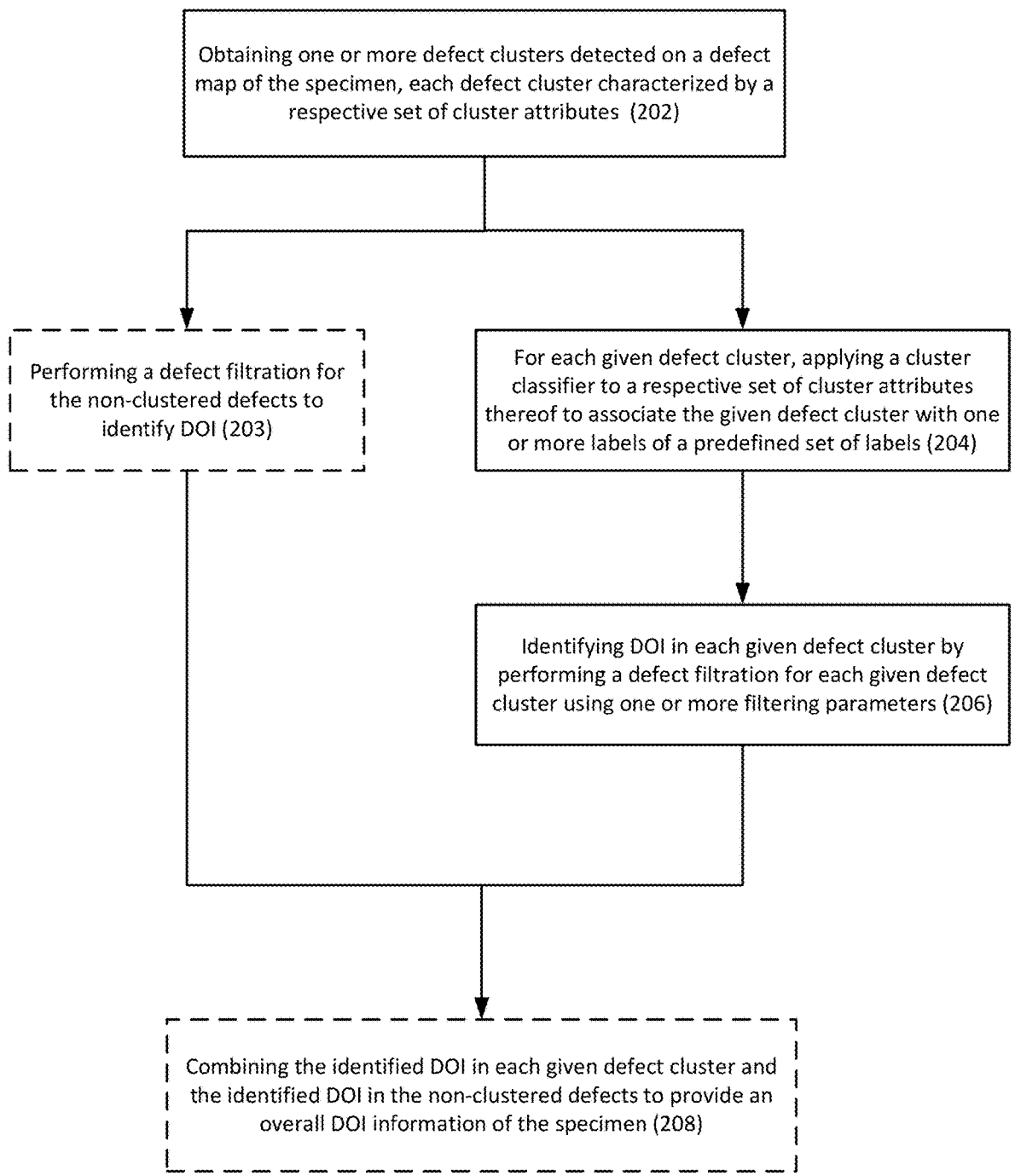
FIG. 2 illustrates a generalized flowchart of classifying defects in a specimen in accordance with certain embodiments of the presently disclosed subject matter.

Referring now to FIG. 2, there is illustrated a generalized flowchart of classifying defects in a specimen in accordance with certain embodiments of the presently disclosed subject matter.

For purpose of illustration only, certain embodiments of the following description are provided with respect to wafers. Embodiments are, likewise, applicable to other types, sizes and representations of specimen.

One or more defect clusters detected on a defect map of the specimen can be obtained (202) (e.g., by the PMC 102 via I/O interface 126). Each of the one or more defect clusters is characterized by a respective set of cluster attributes comprising one or more spatial attributes. In one embodiment, one of the spatial attributes is an attribute of spatial density indicative of density of defects in one or more regions on the defect map accommodating a given defect cluster. Each given defect cluster of the one or more defect clusters can be detected at least based on the spatial density thereof meeting a density criterion (e.g., a threshold/limit).

The defect map of the specimen can be generated (e.g., by a detection module and/or an image processing module whose functionality can be either integrated within the examination tool 120 or within the PMC 102) in various ways based on inspection images captured by the examination tool 120. In certain embodiments, the inspection images of the specimen can be processed with respect to one or more reference images and a detection threshold can be applied on pixel values of the processed images in order to generate the defect map. Different inspection and detection methodologies, such as Die to Die (D2D), Cell to Cell (C2C), Die to History (D2H), Die to Model (D2M) etc., can be applied for processing the inspection images and generating the defect map, and the present disclosure is not limited by specific inspection and detection technologies used therein.

As aforementioned, the defect map can be indicative of suspected locations on the specimen having high probability of being a defect of interest (DOI). Therefore, the suspected defects (also termed as defect candidates) as reflected in the defect map comprise both DOI and nuisance. According to certain embodiments, the defect map may take the form of a list of defects detected on the wafer, including the location of each defect and values of inspection features associated with each defect. The inspection features may include, for example, the size, shape, scattering intensity, directionality, and/or spectral qualities of light scattered from a given defect, as well as defect context and/or any other useful features that are known in the art. Additionally or alternatively, the defect map may take the form of images illustrating defects at respective locations on the wafer as well as the inspection features associated therewith. It is to be noted that the term "defect map" referred to herein should be construed to cover the aforementioned defect data presented in any kind of descriptive and diagnostic form, regardless of the means used to obtain the data, and regardless of whether the data are obtained over the entire wafer or in portions, such as in the vicinity of individual suspect locations.

Generally, defect density differs across a specimen such as a wafer, ranging from regions with none or few defects per unit area to regions with large amount of defects per unit area. The term "defect cluster" used herein refer to defect population in one or more regions of the defect map that meets certain spatial characterization requirements. In one embodiment, a defect cluster can be detected/identified at least upon the spatial density thereof meeting a density criterion (e.g., the spatial density is greater than a certain threshold/limit). Spatial density of a given defect cluster refers to density of defects in one or more regions on the defect map accommodating the given defect cluster, wherein density of defects represents the relationship between the amount of defects within the one or more regions and the area (i.e., the size) of the regions. Such defect clusters are also termed herein as "signatures". Defect density may be varied along a signature, but even so, the density throughout the signature may be above certain floor(s) which may be set variably across the signature (i.e., relative density), and/or may be set to be absolute (i.e., absolute density). Additionally or alternatively, the spatial density criterion can be specified differently for defect clusters with different spatial characterizations, as described below.

A defect cluster may be characterized by a set of cluster attributes comprising one or more spatial attributes including the attribute of spatial density as described above. The one or more spatial attributes can be selected from a group comprising spatial density, area, defect count, spatial shape (or lack thereof—e.g. amorphous), aspect ratio of one or more regions on the defect map accommodating the given defect cluster and/or by any other characteristics. In some embodiments, in addition to or in lieu of the spatial density criterion being met, a defect cluster can be detected/identified in case of specific spatial characterizations being presented. By way of example, in some cases, the spatial density criterion can be specified differently for defect clusters with different spatial characterizations. For instance, different spatial density criteria (e.g., different density thresholds) can be set for defects presented in different spatial shapes. In one example, defects forming a specific shape that is known to be more likely to associate with DOI can be compared with a relative lower density threshold. In some further embodiments, a defect cluster comprising the defects of a specific shape can be determined irrespective of the spatial density thereof.

Defect clusters commonly occur for various reasons, which may range from serious process faults to harmless artifacts in the examination tools. By way of example, possible event(s) that may cause defects in the defect clusters can include, inter-alia: wafer contamination/scratch, instability in CD printing, such as, e.g., stepper/mask issue, irregularity in wafer polish, defocus aberration at a specific region of the wafer, partial dies, etc. It is noted that some of these events, such as, e.g. a scratch on the surface of the wafer, uneven polishing of the wafer surface, etc., may cause thousands of detectable defects. Such a physical occurrence may result in a defect cluster comprising disproportionately high number of defects (e.g. thousands of defects may result from a single scratch, out of about ten thousand defects in an example wafer). This may result, if not handled properly, in large numbers of defects to be passed to further processing stages such as review and automatic defect classification etc., which may cause excursions in the monitoring process and consume excessive processing time. An effective filtration of these large number of defects is needed in order to identify defect candidates that are more likely to be DOI to be sent to further processing, e.g., in review tools.

Defect clusters can be detected in various ways. In some embodiments, a wafer can be divided into a plurality of sub regions/sections, and the spatial density of the defects in each of these areas/sections can be measured. For example, the wafer can be divided into a Cartesian grid or, alternatively, into a radial grid. Defect clusters can be detected as comprising the regions/sections of the grid in which the spatial density of the defects meets a density criterion (e.g., greater than a specified density threshold/limit). As aforementioned, this criterion may be absolute or relative. It may be set differently for defects in regions with different spatial characterizations. In one embodiment, the spatial density of the defects can be assessed at different resolution levels. For this purpose, the wafer can be divided into multiple grids of different scales, meaning that the areas over which the density is measured have different sizes at each of the different resolution levels. An exemplary process for defect cluster detection is described in U.S. Pat. No. 9,613,255 entitled "Systems, methods and computer program products for signature detection" issued on Apr. 4, 2017, which is incorporated herein in its entirety by reference.

As aforementioned, the detected defect clusters can be received via the I/O interface 126 as an input to system 100, or alternatively, the detection process can be performed by the PMC 102 (e.g., by a cluster detection module (not shown in FIG. 1)).

Figure 3:
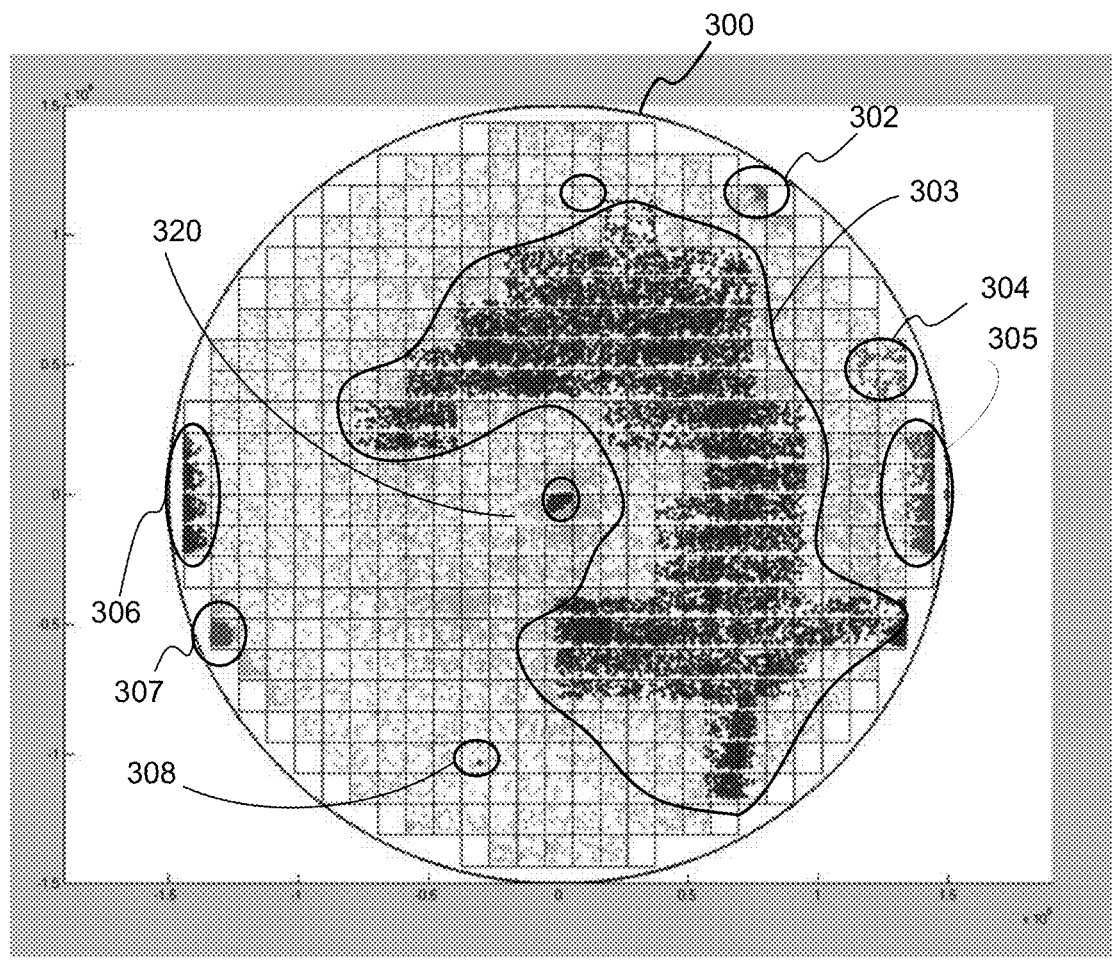
FIG. 3 illustrates a schematic example of defect clusters detected on a defect map in accordance with certain embodiments of the presently disclosed subject matter.

Reference is made to FIG. 3, illustrating a schematic example of defect clusters detected on a defect map in accordance with certain embodiments of the presently disclosed subject matter.

A defect map 300 shows defect candidates distributed over a wafer at respective locations, and also includes values of inspection features associated with each defect (not shown in the figure) detected by an examination tool. Multiple defect clusters 302, 303, . . . 308, etc., are detected on the defect map using the aforementioned detection process, and illustrated in the figure as groups of defects marked by circles. It can be recognized that the defect density in the regions accommodating the defect clusters is significantly higher than the rest or than average. These defect clusters may be characterized by different sizes, shapes, defect counts, density etc., as shown in the figure.

As shown on defect map 300, there are also defects (exemplified by 320) which do not belong to any defect clusters. These defects are referred to as non-clustered defects. In certain embodiments, a defect filtration can be performed (203) (e.g., by the DOI identification module 106) for the non-clustered defects using a defect filter (not illustrated separately in FIG. 1) in order to identify DOI from the non-clustered defects. The defect filtration can be performed using one or more filtering parameters. A defect filter is also referred herein as a defect classifier or nuisance filter which is configured to be applied to defect candidates for performing defect filtration in order to distinguish DOI from nuisance. The defect filter/classifier can be trained using defect training data comprising a plurality of pre-classified defects and defect attributes thereof. In some embodiments, the defect classifier can be implemented as a stand-alone computer operatively connected to system 100 and/or examination tool 120. Alternatively, the defect classifier can be fully or partly integrated with system 100 and/or examination tool 120. For instance, the defect classifier can be hosted by the examination tool.

There is now provided an exemplary illustration of defect classification using a defect filter/classifier. In the following description, the defect classifier is exemplified as a multi-class classifier. Those skilled in the art will readily appreciate that the teachings of the presently disclosed subject matter are, likewise, applicable to any other classifier and or combination of classifiers suitable for classifying defects.

The defect classifier is capable of classifying defects into a plurality of defect classes in accordance with a classification rule. A classification rule comprises a classification engine (e.g. support vector machine (SVM), random forest classification engine, neural networks, etc.) and a plurality of confidence thresholds which can differ for different classes. The defect classifier is further configured to define, for each given defect, a confidence level indicative of probability that the defect belongs to a certain defect class, and to assign the given defect to the certain class if the confidence level meets the respective confidence thresholds.

As a matter of illustration, each defect class can be presented as a volume in the defect attribute hyperspace, and threshold confidence levels can be used for drawing the borders of the class volumes (the bounders of a class volume may be larger or smaller and the shape of the borders can be different depending on the threshold confidence level). In accordance with attributes of a given defect, the classification rule determines the volume in the attribute hyperspace (i.e. class) to which the given defect, subject to the confidence threshold, belongs, or rejects the given defect if it does not belong to one of the volumes (classes).

In a setup stage prior to runtime operation, the defect classifier is trained in a training process using defect training data comprising a plurality of pre-classified defects (e.g. by a human expert and/or another classifier and/or a previous classifier's version, etc.) and defect attributes thereof. When training, the defect classifier uses the defect training data in order to set the classification rule. The classification rule comprises the plurality of confidence thresholds obtained during training and usable for distinguishing between defects that are identified as belonging to a given class, and those that are not. Thus, the trained classifier is capable to define, subject to confidence thresholds, the class of a given defect as a function of defect attributes associated with each predetermined defect class in a multi-dimensional attribute space (referred to hereinafter as an attribute hyperspace).

Upon completion of training, the defect classifier receives in runtime, for each given defect to be classified, a respective set of defect attributes thereof and applies the classification rule to classify the given defect accordingly. Subject to required confidence threshold(s), the defect classifier partitions the attribute hyperspace among predefined defect classes, and yields classified defects by assigning each defect, depending on its location within the attribute hyperspace, to one of the defect classes.

As aforementioned, the borders of the class volumes depend on the threshold confidence levels and different confidence levels will yield different class volumes (class definitions). The bounds of a class volume may be larger or smaller depending on the threshold confidence level that is chosen in order to distinguish between defects that are identified as belonging to the class and those that are not.

The performance of a classification system can be measured by certain performance measures, such as filter rate, DOI capture rate, accuracy, purity, rejection rate and the like. By way of example, classification sensitivity can be indicated by some of the performance measures, such as, e.g., DOI capture rate, filter rate, etc. The performance measures depend on the selection of confidence thresholds for classes. The selection of a desired classification performance (in some cases in terms of e.g., classification sensitivity) and/or corresponding confidence thresholds of classes for achieving the selected performance can be referred herein as a working point for a classifier. The working point can be used as a filtering parameter or one of the one or more filtering parameters used for performing the defect filtration as described with reference to block 203.

During a setup stage, the defect classifier is trained and tuned using estimated prediction of classification results based on training data. A correlation between the values of the performance measures and the values of confidence thresholds is thereby received. Based on a desired performance measure, or a combination of performance measures, a specific set of confidence thresholds for the classes can be determined (the specific set of confidence thresholds and/or the corresponding performance measure (s) constitute a training working point selected to be used in the training process). In one embodiment, the defect filtration for the non-clustered defects as described above with reference to block 203 is performed using the training working point.

Figure 6:
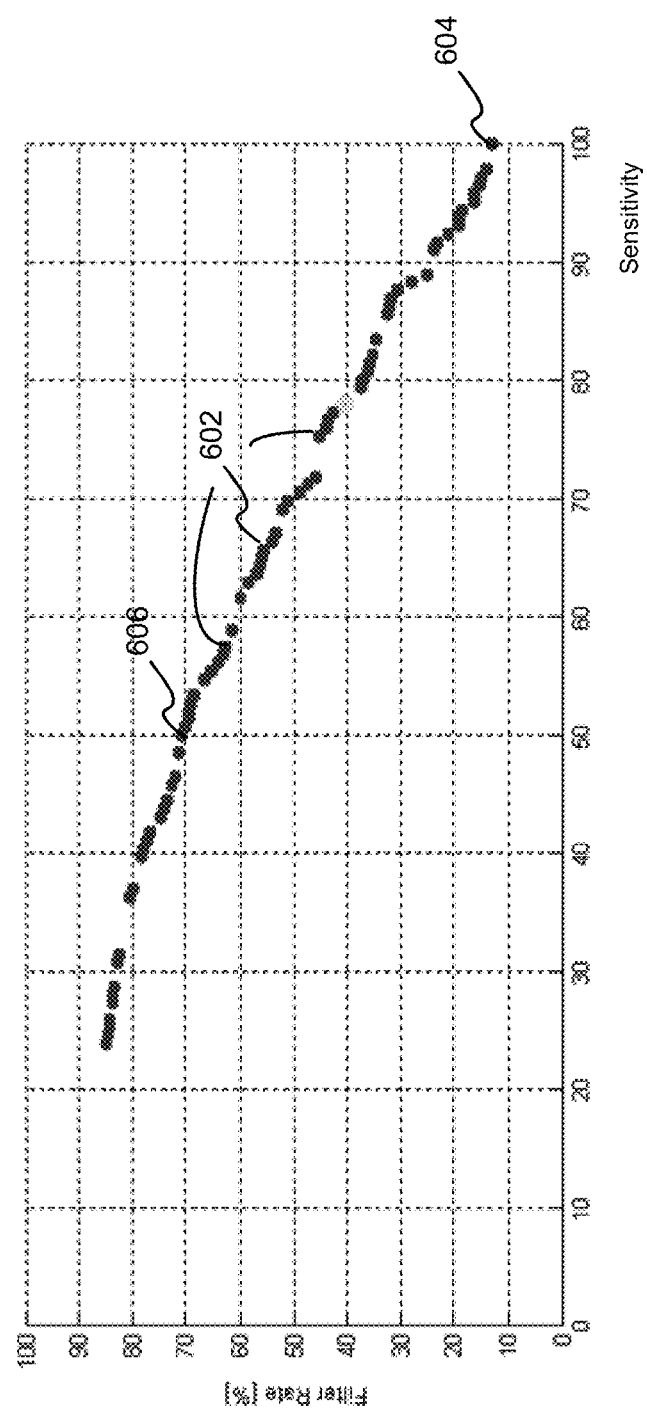
FIG. 6 illustrates an exemplified graph indicative of correlation between filter rate and classification sensitivity based on training data in accordance with certain embodiments of the presently disclosed subject matter.

Turning now to FIG. 6, there is illustrated an exemplified graph indicative of correlation between filter rate and classification sensitivity based on training data in accordance with certain embodiments of the presently disclosed subject matter.

The x axis of the graph indicates classifier sensitivity, meaning the percentage of DOI that are captured by the classifier at a given threshold. The y axis of the graph represents filter rate, which is defined as the percentage of defects that are filtered out (i.e., defects that are classified as nuisance) for a given threshold setting. The plot in FIG. 6 shows a set of working points 602 obtained based on the training data. As shown, at a working point 604 with sensitivity set to the maximum, all DOI can be captured (i.e., the DOI capture rate is 100%), but only a small percentage of the nuisance defects are filtered out (i.e., the filter rate is about 15%). At a more aggressive working point 606, with sensitivity set to only 50%, for example, the filter rate reaches 70%. In other words, most of the nuisance defects are filtered out, but at the cost of filtering out a large fraction of the DOI as well. Therefore, each working point provides a different trade-off between the two performance measures of classifier sensitivity and filter rate.

Non-limiting examples of training and operating classifiers are disclosed in US Patent Application No. US 2016/0189055, U.S. Pat. Nos. 8,315,453, 9,607,233 and 9,715,723 assigned to the Assignee of the present application and incorporated herein by reference in their entireties for appropriate teachings of additional or alternative details, features and/or technical background.

Continuing with the description of FIG. 2, for each given defect cluster, a cluster classifier can be applied (204) (e.g., by the Cluster labelling module 104) to a respective set of cluster attributes of the given defect cluster to associate the given defect cluster with one or more labels of a predefined set of labels. The cluster classifier can be trained based on cluster training data comprising a plurality of pre-labelled defect clusters and cluster attributes thereof.

The cluster classifier is an automated classifying tool that is capable of classifying the defect clusters into a plurality of defect cluster classes corresponding to the predefined set of labels. The classified defect cluster is then associated with one or more corresponding labels. Accordingly, each label in the predefined set of labels is indicative of a defect cluster class. A given defect cluster class at least represents that a defect cluster classified thereto comprises an expected percentage of a specific category of defects or a type of defects in a specific category. The expected percentage meets classification criterion of that given class. The specific category is selected from a group constituted of DOI and nuisance. In one embodiment, the predefined set of labels comprises a first label indicative of a first class and a second label indicative of a second class, as will be described below in details with reference to FIG. 4.

The cluster classifier can be implemented in a similar mechanism as described above with reference to the defect classifier. Each defect cluster class can be presented as a volume in the cluster attribute hyperspace. In accordance with cluster attributes of a given defect cluster, the classification rule determines the volume in the attribute hyperspace (i.e. class) to which the given defect cluster belongs.

Similarly, in a setup phase prior to runtime operation, the cluster classifier is trained using cluster training data comprising a plurality of pre-labelled defect clusters (e.g. by a human expert, etc.) and cluster attributes thereof. When training, the cluster classifier uses the cluster training data in order to set the classification rule. Thus, the trained classifier is capable to define, subject to confidence thresholds, the class of a given defect cluster as a function of cluster attributes associated with each predetermined defect cluster class in a cluster attribute hyperspace.

Upon completion of training, the cluster classifier receives in runtime, for each given defect cluster to be classified, a respective set of cluster attributes thereof and applies the classification rule to classify the given defect cluster accordingly. Subject to required confidence threshold (s), the cluster classifier partitions the attribute hyperspace among predefined defect cluster classes, and yields classified defect clusters by assigning each defect cluster, depending on its location within the attribute hyperspace, to one of the cluster classes.

As aforementioned, the set of cluster attributes can comprise one or more spatial attributes selected from a group comprising spatial density, area, defect count, shape, and aspect ratio of the one or more regions on the defect map accommodating the given defect cluster. In some embodiments, the set of cluster attributes can further comprise a filter rate related attribute. In one embodiment, the filter rate related attribute refers to a cluster filter rate indicative of the number of defects filtered out when applying a defect filter to defects in a given defect cluster as relative to the total number of defects in the given defect cluster (i.e., the percentage of filtered defects). The defects filtered out refer to defects that are classified as nuisance by the defect filter. In some further embodiments, the filter rate related attribute can be derived based on the cluster filter rate.

Figure 4:
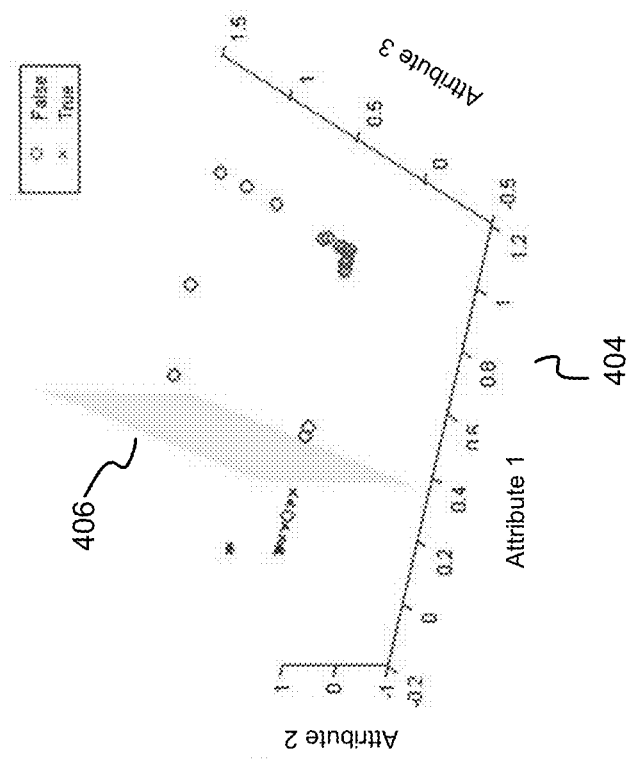
FIG. 4 illustrates a schematic representation of an example of cluster attribute hyperspace in accordance with certain embodiments of the presently disclosed subject matter.
Figure 4:
Figure 4:
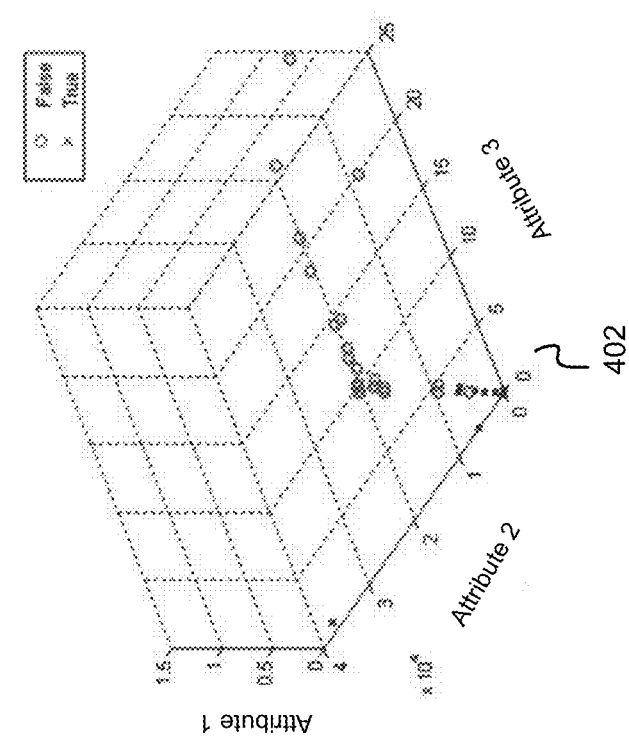

Reference is made to FIG. 4, illustrating a schematic representation of an example of cluster attribute hyperspace in accordance with certain embodiments of the presently disclosed subject matter.

For the sake of visual simplicity, a cluster attribute hyperspace 402 is represented as being three-dimensional, but the classification processes that are described herein may be carried out in spaces of lower and higher dimensionality. The cluster attributes used in the present example comprises three attributes (i.e., attributes 1, 2 and 3) as illustrated in the cluster attribute hyperspace 402. Attributes 1, 2 and 3 can be any attribute selected from the group as described above.

In the current example, the defect clusters are assumed to belong to two predefined cluster classes, the first class corresponding to a first label (which is illustrated in the figure as "True"), and the second class corresponding to a second label (which is illustrated in the figure as "False"). The first class at least represents that a defect cluster classified thereto comprises an expected percentage of DOI (e.g., a relatively high fraction of DOI, or in some cases, a significantly larger fraction of DOI than nuisance). In other words, the defect cluster classified into the first class (also referred hereinafter as true cluster) comprises defects that are more likely to be classified as DOI. The expected percentage of DOI in the true clusters can be recognized as meeting a first class classification criterion, which can be represented, e.g., by a range of at least a certain cluster attribute (e.g., filter rate) as reflected in the volume in the cluster attribute hyperspace associated with the first class.

Similarly, the second class at least represents that a defect cluster classified thereto comprises an expected percentage of nuisance (e.g., a significantly larger fraction of nuisance than DOI). In other words, the defect cluster in the second class (also referred hereinafter as false cluster) comprises defects that are more likely to be classified as nuisance. The expected percentage of nuisance in the false clusters can be recognized as meeting a second class classification criterion, which can be represented, e.g., by a range of at least a certain attribute (e.g., filter rate) as reflected in the volume in the cluster attribute hyperspace associated with the second class.

In another illustration of the cluster attribute hyperspace 404 from a different perspective, the first class and the second class are separated by a boundary (shown as a plane 406 partitioning the hyperspace), subject to required confidence threshold(s). Each defect cluster can be classified, depending on its location within the attribute hyperspace, to one of the two cluster classes (true clusters are marked with crosses and false clusters are marked with circles in the figure).

In certain embodiments, the predefined set of labels can comprise labels indicative of defect cluster classes at least representing defect clusters classified thereto comprises an expected percentage of a specific type of defects in a specific category. The expected percentage meets classification criterion of respective cluster class. The specific type of defects can be selected from a group comprising, e.g., short, particle, scratch, process, and any other known types of defects in the field. Therefore, the labels can indicate, in addition to categories of defects such as DOI and nuisance, specific defect types within each category, such as, e.g., short type in DOI, scratch type in DOI, particle type in nuisance, etc. The predefined cluster classes corresponding to the labels can represent defect clusters classified thereto comprising a certain percentage of defects in specific defect types within each category. In other words, the cluster classes can be deemed as comprising a plurality of sub-classes (each indicative of a specific defect type) within the first class (representing true clusters) and a plurality of sub-classes within the second class (representing false clusters). For each sub-class, there can be one or more labels associated therewith. For instance, for a given sub-class of short type in DOI, there can be a single label of "short DOI" to be associated with the given sub-class. Alternatively, there can be two labels associated therewith, one primary label of "DOI" and a secondary label of "short". The present disclosure is not limited by the specific implementation of association between cluster classes and labels.

In order to train a cluster classifier to be able to classify defect clusters into sub-classes as described above, cluster training data need to be collected in setup stage including a plurality of defect clusters pre-classified into these sub-classes (e.g., by a human operator) and specific cluster attributes thereof characterizing these sub-classes. In runtime stage, the same cluster attributes need to be obtained when generating the defect clusters, such that the trained cluster classifier can be applied to these specific attributes for performing the classification.

It is to be noted that the above described cluster attributes as well as the predefined labels and classes used herein are illustrated for exemplified purposes and should not be construed to limit the present disclosure in any way. Any other suitable attributes and/or predefined labels/classes can be applied in lieu of or in addition to the above.

Referring back to FIG. 2, once the defect clusters are classified and associated with respective labels, DOI can be identified (206) (e.g., by the DOI identification module 106) in each given defect cluster by performing a defect filtration for each given defect cluster using one or more filtering parameters. The one or more filtering parameters can be specified in accordance with the label of the given defect cluster.

The defect filtration for each defect cluster can be performed in a similar manner as described with reference to block 203. A defect filter/classifier as described above can be used for performing the defect filtration. In some embodiments, the one or more filtering parameters can comprise a working point which is specified in accordance with the specific label of the given defect cluster. Therefore, defect filtration is performed adaptively for different defect clusters in accordance with respective working points corresponding to their respective labels. The working point specified in accordance with the label can be selected as relative to the training working point (as used in the defect filtration for the non-clustered defects) based on a classification sensitivity corresponding to the label.

In the case of the predefined set of labels comprising a first label and a second label corresponding to two predefined defect cluster classes, as described with reference to FIG. 4, where the true clusters classified into the first class comprise defects that are more likely to be classified as DOI and the false clusters classified into the second class comprises defects that are more likely to be classified as nuisance, the working point specified in accordance with the first label can be selected as a sensitive working point as relative to the training working point, and the working point specified in accordance with the second label can be selected as an aggressive working point as relative to the training working point.

For the true clusters associated with the first label, since most of the defects therein are more likely to be DOI, a sensitive working point can be selected for the defect filter/classifier, i.e., relatively higher sensitivity as compared to the training working point, in order to capture a larger fraction of DOI in the true cluster. On the other hand, for the false clusters associated with the second label, since most (or at least a large fraction) of the defects therein are more likely to be nuisance, an aggressive working point can be selected for the defect filter/classifier, i.e., relatively lower sensitivity as compared to the training working point, which filters out a larger percentage of the defects as nuisance and passes defects with a high probability of actually being DOI. Thus, despite a defect cluster is labeled as a false cluster, at least some of the DOI that happen to fall within this cluster can be recovered through the defect filtration.

In certain embodiments, the identified DOI in each given defect cluster (as described with reference to block 206) and the identified DOI in the non-clustered defects (as described with reference to block 203) can be combined (208) (e.g., by the DOI identification module 106) to provide an overall DOI information of the specimen. Optionally, the overall DOI information can be passed for further analysis, such as, e.g., by a review tool.

Figure 5:
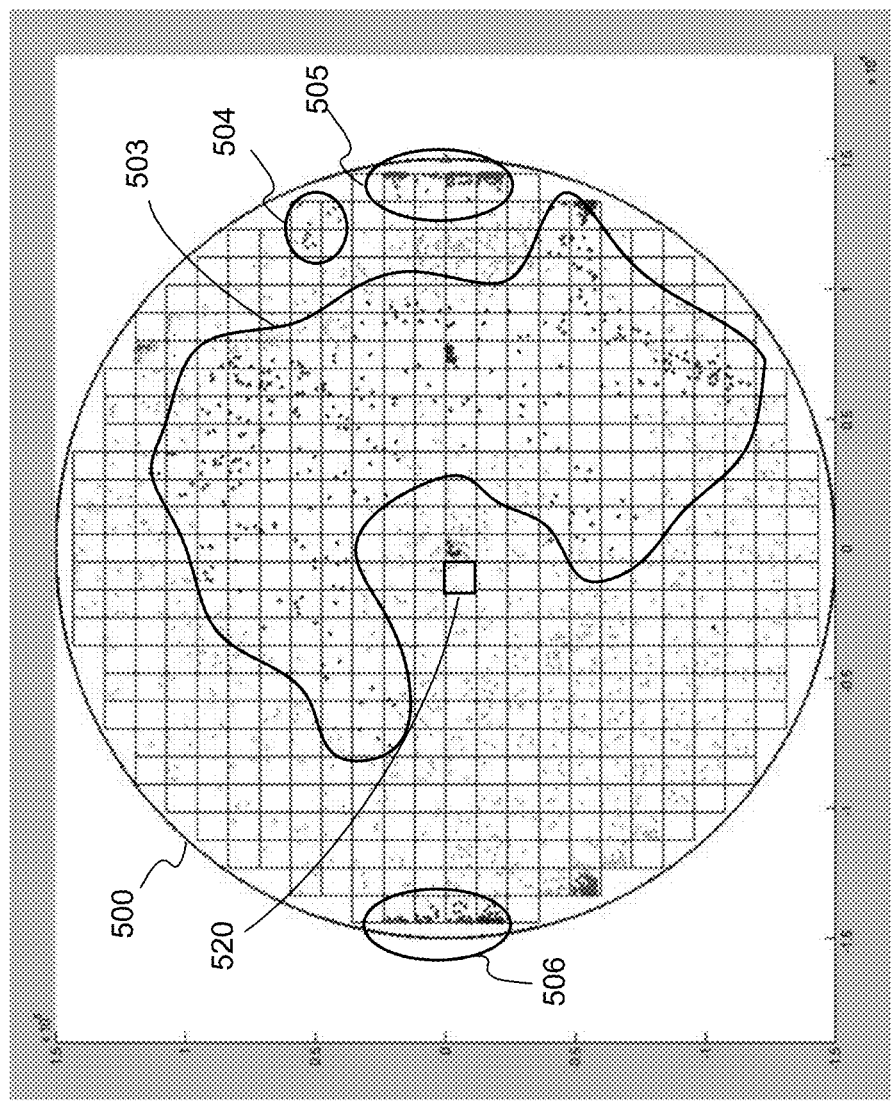
FIG. 5 illustrates a schematic example of DOI identified on a defect map in accordance with certain embodiments of the presently disclosed subject matter.

Turning now to FIG. 5, there is illustrated a schematic example of DOI identified on a defect map in accordance with certain embodiments of the presently disclosed subject matter.

The DOI information 500 illustrated in FIG. 5 correspond to the defect map 300 as described with reference to FIG. 3. The defect clusters 302, 303, . . . 308, etc., went through the cluster classification process as described with reference to blocks 204. For illustration and exemplary purposes only, assume that defect clusters 303 and 304 are classified as false clusters, and defect clusters 305 and 306 are classified as true clusters. The classified clusters went through the adaptive defect filtration process as described with reference to block 206, using different working points. The non-clustered defects 320 went through the defect filtration process as described with reference to block 203. Part of the identified DOI in the true and false defect clusters (marked by circles), as well as identified DOI in the non-clustered defects (marked by a square) are combined and illustrated in FIG. 5. For purpose of illustration, DOI 503 and 504 are identified from corresponding false clusters 303 and 304, and DOI 505 and 506 are identified from corresponding true clusters 305 and 306. DOI 520 is identified from corresponding non-clustered defects 320. As shown, proportionally, there are more DOI identified from the true clusters since a sensitive working point is used for defect filtration in these defect populations. Much less DOI are extracted from the false clusters and the non-clustered defects, due to less sensitive working point selections in these populations. By applying the adaptive defect filtration for different defect populations, the overall defect detection sensitivity is improved. In addition, the instability of excursions occurring in the monitoring process caused by abnormal quantities of defects resulted from defect clusters, as aforementioned, can also be solved, as described below with reference to FIG. 7.

Figure 7:
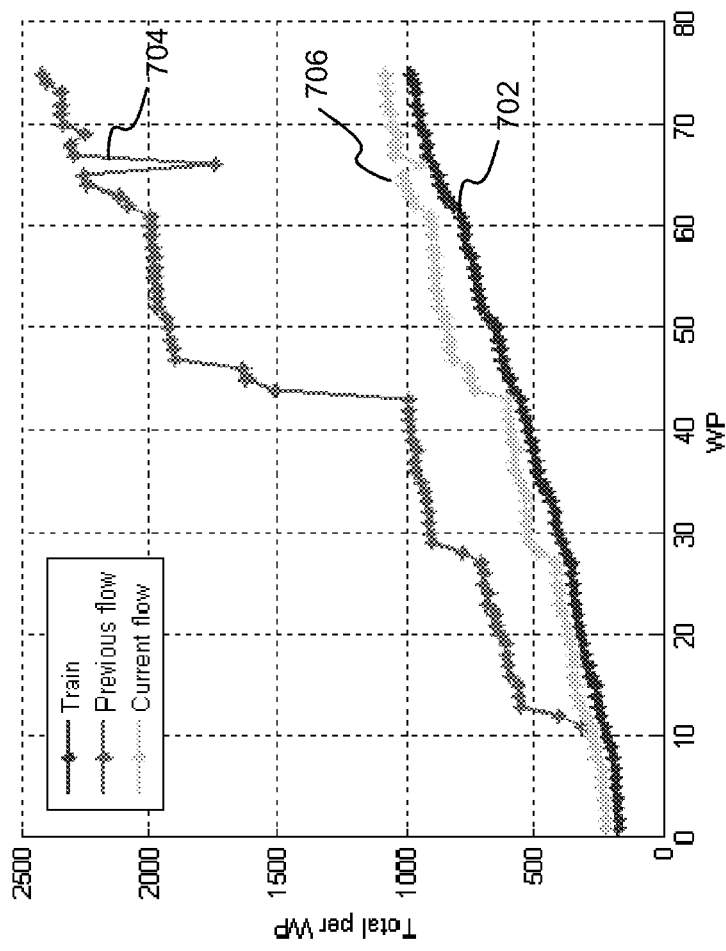
FIG. 7 illustrates a schematic graph of DOI identification comparison in accordance with certain embodiments of the presently disclosed subject matter.

Referring now to FIG. 7, there is illustrated a schematic graph of DOI identification comparison in accordance with certain embodiments of the presently disclosed subject matter.

FIG. 7 presents a graph with x axis representing different working points and y axis representing the total number of identified DOI. Plot 706 represents the total number of DOI identified using the current proposed process at given working points, whereas plot 704 represents the total number of DOI identified using a previous process in which adaptive filtration is not applied and all defect populations (including defect clusters and non-clustered defects) employ the same working point in filtration. As compared to plot 702 which represents the total number of DOI identified in the training process which represents normal behavior of defect data, it can be seen that plot 704 exhibits abnormal quantity of defects which cause excursions (illustrated as a leap from plot 702). By employing the adaptive defect filtration in accordance with the current proposed process, the total number of DOI identified, as represented by plot 706, is much closer and behaves in a similar manner to that of the training data.

It is to be noted that the examples shown in the figures are only for illustrative purposes and should not be deemed to limit the present disclosure in any way. Any one skilled in the art would readily appreciate that any other suitable implementations or illustrations can be used in addition or in lieu of the illustrated examples.

It is also noted that whilst the flow charts illustrated in in FIG. 2 are described with reference to elements of system 100, this is by no means binding, and the operations can be performed by elements other than those described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable storage medium tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

What is claimed is:

1. A computerized system capable of classifying defects in a specimen, the system comprising a processing and memory circuitry (PMC) configured to:

obtain one or more defect clusters detected on a defect map of the specimen, each defect cluster of the one or more defect clusters characterized by a respective set of cluster attributes comprising one or more spatial attributes, wherein the one or more spatial attributes include spatial density indicative of density of defects in one or more regions on the defect map accommodating a respective defect cluster, and each defect cluster of the one or more defect clusters is detected at least based on the spatial density thereof meeting a density criterion;

for each defect cluster of the one or more defect clusters, apply a cluster classifier to a respective set of cluster attributes thereof to associate the respective defect cluster with one or more labels of a predefined set of labels, wherein the cluster classifier is trained using cluster training data comprising a plurality of pre-labelled defect clusters and cluster attributes thereof; and identify Defects of Interest (DOI) in each defect cluster of the one or more defect clusters by performing a defect filtration for each given defect cluster of the one or more defect clusters using one or more filtering parameters, wherein the one or more filtering parameters are specified in accordance with the one or more labels of the respective defect cluster, wherein the set of cluster attributes further comprise a cluster filter rate indicative of a number of defects filtered out when applying a defect filter in a respective defect cluster as relative to a total number of defects in the respective defect cluster, the defect filter being trained using defect training data comprising a plurality of pre-classified defects and defect attributes thereof.

2. The computerized system of claim 1, wherein the defect map comprises non-clustered defects, and wherein the PMC is further configured to identify DOI in the non-clustered defects by performing a defect filtration for the non-clustered defects using one or more filtering parameters, and combine the identified DOI in each defect cluster of the one or more defect clusters and the identified DOI in the non-clustered defects to provide an overall DOI information of the specimen.

3. The computerized system of claim 1, wherein the one or more spatial attributes are selected from a group comprising spatial density, area, defect count, shape, and aspect ratio of the one or more regions on the defect map accommodating the respective defect cluster.

4. The computerized system of claim 1, wherein the density criterion is specified differently for defect clusters with different spatial characterizations.

5. The computerized system of claim 1, wherein each label is indicative of a respective defect cluster class, the respective defect cluster class at least representing that a defect cluster classified thereto comprises an expected percentage of a specific category of defects or a type of defects in a specific category that meets classification criterion of the respective defect cluster class, and wherein the specific category is selected from a group constituted of DOI and nuisance.

6. The computerized system of claim 1, wherein the predefined set of labels comprises a first label and a second label, wherein the first label is indicative of a first class at least representing that a defect cluster classified thereto comprises an expected percentage of DOI that meets a first class classification criterion, and the second label is indicative of a second class at least representing that a defect cluster classified thereto comprises an expected percentage of nuisance that meets a second class classification criterion.

7. The computerized system of claim 2, wherein the one or more filtering parameters comprise a working point.

8. The computerized system of claim 7, wherein the defect filtration for the non-clustered defects is performed using a second defect filter with a training working point, the second defect filter being trained in a training process based on defect training data comprising a plurality of pre-classified defects and defect attributes thereof, and the training working point is a working point selected to be used in the training process.

9. The computerized system of claim 8, wherein a working point specified in accordance with the one or more labels of a respective defect cluster is selected as relative to the training working point based on a classification sensitivity corresponding to a respective label.

10. The computerized system of claim 8, wherein the predefined set of labels comprises a first label and a second label selectable as the one or more labels to specify a working point specified in accordance with the first label and a working point specified in accordance with the second label, wherein the first label is indicative of a first class at least representing that a defect cluster classified thereto comprises an expected percentage of DOI that meets a first class classification criterion, and the second label is indicative of a second class at least representing that a defect cluster classified thereto comprises an expected percentage of nuisance that meets a second class classification criterion, and wherein the working point specified in accordance with the first label is selected as a sensitive working point as relative to the training working point, and the working point specified in accordance with the second label is selected as an aggressive working point as relative to the training working point.

11. The computerized system of claim 1, further comprising an examination tool configured to examine the specimen and obtain the defect map thereof.

12. A computerized method of classifying defects in a specimen, the method comprising:
obtaining, by an I/O interface, one or more defect clusters detected on a defect map of the specimen, each defect cluster of the one or more defect clusters characterized by a respective set of cluster attributes comprising one or more spatial attributes, wherein the one or more spatial attributes include spatial density indicative of density of defects in one or more regions on the defect map accommodating a respective defect cluster, and each defect cluster of the one or more defect clusters is detected at least based on the spatial density thereof meeting a density criterion;

for each defect cluster of the one or more defect clusters, applying, by a processing and memory circuitry (PMC) operatively connected to the I/O interface, a cluster classifier to a respective set of cluster attributes thereof to associate the respective defect cluster with one or more labels of a predefined set of labels, wherein the cluster classifier is trained using cluster training data comprising a plurality of pre-labelled defect clusters and cluster attributes thereof; and identifying, by the PMC, DOI in each defect cluster of the one or more defect clusters by performing a defect filtration for each defect cluster of the one or more defect cluster using one or more filtering parameters, wherein the one or more filtering parameters are specified in accordance with the one or more labels of the respective defect cluster, wherein the set of cluster attributes further comprise a cluster filter rate indicative of a number of defects filtered out when applying a defect filter in a respective defect cluster as relative to a total number of defects in the respective defect cluster, the defect filter being trained using defect training data comprising a plurality of pre-classified defects and defect attributes thereof.

13. The computerized method of claim 12, wherein the defect map comprises non-clustered defects, and wherein the method further comprises identifying DOI in the non-clustered defects by performing a defect filtration for the non-clustered defects using one or more filtering parameters, and combining the identified DOI in each defect cluster and the identified DOI in the non-clustered defects to provide an overall DOI information of the specimen.

14. The computerized method of claim 13, wherein the one or more filtering parameters comprise a working point, and wherein the defect filtration for the non-clustered defects is performed using a second defect filter with a training working point, the second defect filter being trained in a training process based on defect training data comprising a plurality of pre-classified defects and defect attributes thereof, and the training working point is a working point selected to be used in the training process.

15. The computerized method of claim 14, wherein a working point specified in accordance with the one or more labels of a respective defect cluster is selected as relative to the training working point based on a classification sensitivity corresponding to a respective label.

16. The computerized method of claim 14, wherein the predefined set of labels comprises a first label and a second label selectable as the one or more labels to specify a working point specified in accordance with the first label and a working point specified in accordance with the second label, wherein the first label is indicative of a first class at least representing that a defect cluster classified thereto comprises an expected percentage of DOI that meets a first class classification criterion, and the second label is indicative of a second class at least representing that a defect cluster classified thereto comprises an expected percentage of nuisance that meets a second class classification criterion, and wherein the working point specified in accordance with the first label is selected as a sensitive working point as relative to the training working point, and the working point specified in accordance with the second label is selected as an aggressive working point as relative to the training working point.

17. A non-transitory computer readable medium comprising instructions that, when executed by a computer, cause the computer to perform a method of classifying defects in a specimen, the method comprising:

obtaining one or more defect clusters detected on a defect map of the specimen, each defect cluster of the one or more defect clusters characterized by a respective set of cluster attributes comprising one or more spatial attributes, wherein the one or more spatial attributes include spatial density indicative of density of defects in one or more regions on the defect map accommodating a respective defect cluster, and each defect cluster of the one or more defect clusters is detected at least based on the spatial density thereof meeting a density criterion;

for each defect cluster of the one or more defect clusters, applying a cluster classifier to a respective set of cluster attributes thereof to associate the respective defect cluster with one or more labels of a predefined set of labels, wherein the cluster classifier is trained using cluster training data comprising a plurality of pre-labelled defect clusters and cluster attributes thereof; and identifying DOI in each defect cluster of the one or more defect clusters by performing a defect filtration for each defect cluster of the one or more defect clusters using one or more filtering parameters, wherein the one or more filtering parameters are specified in accordance with the one or more labels of the respective defect cluster, wherein the set of cluster attributes further comprise a cluster filter rate indicative of a number of defects filtered out when applying a defect filter in a respective defect cluster as relative to a total number of defects in the respective defect cluster, the defect filter being trained using defect training data comprising a plurality of pre-classified defects and defect attributes thereof.

18. The non-transitory computer readable medium of claim 17, wherein the defect map comprises non-clustered defects, and wherein the PMC is further configured to identify DOI in the non-clustered defects by performing a defect filtration for the non-clustered defects using one or more filtering parameters, and combine the identified DOI in each defect cluster of the one or more defect clusters and the identified DOI in the non-clustered defects to provide an overall DOI information of the specimen.

19. The non-transitory computer readable medium of claim 17, wherein the density criterion is specified differently for defect clusters with different spatial characterizations.

20. The non-transitory computer readable medium of claim 17, wherein each label is indicative of a respective defect cluster class, the respective defect cluster class at least representing that a defect cluster classified thereto comprises an expected percentage of a specific category of defects or a type of defects in a specific category that meets classification criterion of the respective defect cluster class, and wherein the specific category is selected from a group constituted of DOI and nuisance.

* * * * *